(12) United States Patent
Sureda et al.

(10) Patent No.: US 11,611,576 B2
(45) Date of Patent: Mar. 21, 2023

(54) METHODS AND SYSTEMS FOR SECURING AN IMAGING SYSTEM

(71) Applicant: GE Precision Healthcare LLC, Milwaukee, WI (US)

(72) Inventors: Francisco Sureda, Chatenay-Malabry (FR); Luc Glatigny, Buc (FR); Mara Olaru, Buc (FR)

(73) Assignee: GE Precision Healthcare LLC, Milwaukee, WI (US)

( * ) Notice: Subject to any disclaimer, the term of this patent is extended or adjusted under 35 U.S.C. 154(b) by 394 days.

(21) Appl. No.: 16/711,170

(22) Filed: Dec. 11, 2019

(65) Prior Publication Data

US 2021/0185067 A1 Jun. 17, 2021

(51) Int. Cl.
*G06F 21/55* (2013.01)
*H04L 9/40* (2022.01)

(52) U.S. Cl.
CPC ........ *H04L 63/1425* (2013.01); *G06F 21/552* (2013.01); *G06F 21/554* (2013.01); *H04L 63/1416* (2013.01)

(58) Field of Classification Search
CPC ............. H04L 63/1425; H04L 63/1416; G06F 21/552; G06F 21/554; G06F 21/608
See application file for complete search history.

(56) References Cited

U.S. PATENT DOCUMENTS

| | | | | |
|---|---|---|---|---|
| 6,646,750 | B1 * | 11/2003 | Christoph | G01B 11/007 356/601 |
| 9,516,053 | B1 * | 12/2016 | Muddu | G06V 10/225 |
| 2010/0316266 | A1 * | 12/2010 | Minagawa | G16H 50/20 382/128 |
| 2011/0126273 | A1 * | 5/2011 | Bhatia | G06F 21/31 726/3 |
| 2011/0267496 | A1 * | 11/2011 | Nakamura | H04N 1/2158 348/E7.024 |
| 2014/0324469 | A1 * | 10/2014 | Reiner | G16H 50/70 705/3 |
| 2014/0380104 | A1 * | 12/2014 | Lee | G06F 11/0748 714/45 |
| 2015/0089365 | A1 * | 3/2015 | Zhao | G16H 10/60 715/708 |

(Continued)

FOREIGN PATENT DOCUMENTS

WO 2018049437 A2 3/2018

OTHER PUBLICATIONS

Hassan Sharghi, Kamran Sartipi, A User Behavior-based Approach to Detect the Insider Threat in Distributed Diagnostic Imaging Systems, IEEE, 2016.*

(Continued)

*Primary Examiner* — David Garcia Cervetti
(74) *Attorney, Agent, or Firm* — McCoy Russell LLP (57) ABSTRACT

Various methods and systems for securing imaging systems are provided. In one embodiment, a method for an imaging system comprises monitoring usage of the imaging system in real-time while a user is controlling the imaging system, detecting that the usage of the imaging system is an abnormal usage, and performing one or more corrective actions based on the abnormal usage. In this way, an imaging system may be secured from cyber-attacks that may attempt to maliciously execute in an abnormal context while appearing legitimate to typical security controls.

20 Claims, 4 Drawing Sheets

(56) References Cited

U.S. PATENT DOCUMENTS

| | | | |
|---|---|---|---|
| 2015/0254555 A1* | 9/2015 | Williams, Jr. | G06N 3/084 706/14 |
| 2015/0261955 A1* | 9/2015 | Huang | G06F 21/567 726/23 |
| 2015/0331995 A1* | 11/2015 | Zhao | G16H 50/20 705/2 |
| 2015/0373043 A1* | 12/2015 | Wang | G06F 21/6254 706/12 |
| 2016/0080418 A1* | 3/2016 | Ray | H04L 63/1416 726/1 |
| 2017/0054702 A1* | 2/2017 | Turgeman | G06F 21/31 |
| 2017/0093910 A1* | 3/2017 | Gukal | H04L 63/1416 |
| 2017/0132381 A1* | 5/2017 | Lee | G16H 40/63 |
| 2017/0214701 A1 | 7/2017 | Hasan | |
| 2017/0281118 A1* | 10/2017 | Hirayu | A61B 6/5205 |
| 2018/0069867 A1* | 3/2018 | Grajek | H04W 12/068 |
| 2018/0103047 A1* | 4/2018 | Turgeman | G06Q 20/4014 |
| 2018/0288063 A1* | 10/2018 | Koottayi | H04L 63/1416 |
| 2018/0299495 A1* | 10/2018 | Abbas | G01R 22/066 |
| 2018/0332072 A1* | 11/2018 | Ford | H04L 63/1433 |
| 2018/0375886 A1* | 12/2018 | Kirti | H04L 63/1425 |
| 2019/0020669 A1* | 1/2019 | Glatfelter | G06N 20/00 |
| 2019/0068627 A1* | 2/2019 | Thampy | H04W 12/12 |
| 2019/0095320 A1* | 3/2019 | Biswas | G06F 21/577 |
| 2019/0098037 A1* | 3/2019 | Shenoy, Jr. | H04L 63/1441 |
| 2019/0124118 A1* | 4/2019 | Swafford | H04L 63/1408 |
| 2019/0207969 A1* | 7/2019 | Brown | G06F 21/552 |
| 2019/0260777 A1* | 8/2019 | Mehrotra | H04L 63/08 |
| 2019/0272384 A1* | 9/2019 | Kawabata | G06F 21/60 |
| 2019/0318100 A1* | 10/2019 | Bhatia | G06F 21/57 |
| 2020/0028876 A1* | 1/2020 | Cohen | H04L 63/1425 |
| 2020/0076844 A1* | 3/2020 | Barbiaux | H04L 63/1441 |
| 2020/0104775 A1* | 4/2020 | Chintalapati | G06T 11/206 |
| 2020/0128047 A1* | 4/2020 | Biswas | H04L 67/10 |
| 2020/0159937 A1* | 5/2020 | Schondorf | G06F 21/554 |
| 2020/0204574 A1* | 6/2020 | Christian | H04L 63/12 |
| 2020/0320203 A1* | 10/2020 | Ting | G16H 10/60 |
| 2020/0327225 A1* | 10/2020 | Nguyen | G06N 20/20 |
| 2020/0336503 A1* | 10/2020 | Xu | H04L 63/1425 |
| 2020/0382536 A1* | 12/2020 | Dherange | G06F 16/906 |
| 2021/0051163 A1* | 2/2021 | Kublanov | H04L 63/1416 |
| 2021/0075800 A1* | 3/2021 | Paraskevas | H04W 4/48 |
| 2021/0160261 A1* | 5/2021 | Kwatra | G06F 21/566 |
| 2021/0182413 A1* | 6/2021 | Agarwal | G06F 21/6245 |
| 2021/0185067 A1* | 6/2021 | Sureda | G06F 21/554 |
| 2021/0194915 A1* | 6/2021 | Duo | H04L 63/145 |
| 2021/0235967 A1* | 8/2021 | Koizumi | A61B 5/0013 |
| 2022/0133258 A1* | 5/2022 | Yin | A61B 6/545 378/97 |

OTHER PUBLICATIONS

"New Cyber Security Approaches for Medical Imaging Devices Are Required, According to BGU's Malware Lab Researchers," Cyber Ben-Gurion University of the Negev Website, Available Online at https://cyber.bgu.ac.il/media/new-cyber-security-approaches-for-medical-imaging-devices-are-required-according-to-bgus-malware-lab-researchers/, Jan. 31, 2018, 5 pages.

Shen, Y. et al., "Tiresias: Predicting Security Events Through Deep Learning," Proceedings of the 2018 ACM SIGSAC Conference on Computer and Communications Security (CSS '18), Oct. 15, 2018, Toronto, Canada, 14 pages.

* cited by examiner

METHODS AND SYSTEMS FOR SECURING AN IMAGING SYSTEM

FIELD

Embodiments of the subject matter disclosed herein relate to medical imaging systems in general, and in particular to cybersecurity for imaging systems.

BACKGROUND

Non-invasive imaging technologies allow images of the internal structures of a patient or object to be obtained without performing an invasive procedure on the patient or object. In particular, technologies such as computed tomography (CT) use various physical principles, such as the differential transmission of x-rays through the target volume, to acquire image data and to construct tomographic images (e.g., three-dimensional representations of the interior or the human body or of other imaged structures).

BRIEF DESCRIPTION

In one embodiment, a method for an imaging system comprises monitoring usage of the imaging system in real-time while a user is controlling the imaging system, detecting that the usage of the imaging system is an abnormal usage, and performing one or more corrective actions based on the abnormal usage. In this way, an imaging system connected to a hospital network may be secured from cyber-attacks via the network that may attempt to maliciously execute in an abnormal context while appearing legitimate to typical security controls.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of cybersecurity for imaging systems. In particular, systems and methods for securing imaging systems from cyber-attacks are provided. For example, an interventional x-ray imaging system is a medical device used during minimally-invasive interventional procedures and surgeries to create live images and to perform functions for supporting the procedures. The device is connected to hospital networks, which make the device vulnerable to sophisticated cyber-attacks that can target the infrastructure and components of the device to disrupt the imaging procedure. A large number of highly-effective security controls exist today to protect computing systems from cyber-attacks and may be implemented on interventional imaging devices for reducing or eliminating the impact of cyber-attacks. However, these security measures may lose effectiveness over time, as cyber-attackers are always developing more sophisticated skills and creating new ways to compromise devices, especially by focusing on exploiting software vulnerabilities that may not yet be identified. As such, cybersecurity is a moving target, wherein a good countermeasure today may be ineffective tomorrow. Even if software is regularly updated with security patches or updates to prevent the exploitation of new vulnerabilities, the device remains vulnerable to zero-day attacks (i.e., exploits of known vulnerabilities for which the patch is not released). Moreover, as interventional imaging systems are complex systems subject to strict regulations, software updates may occur less regularly due to long verification cycles.

Figure 1:
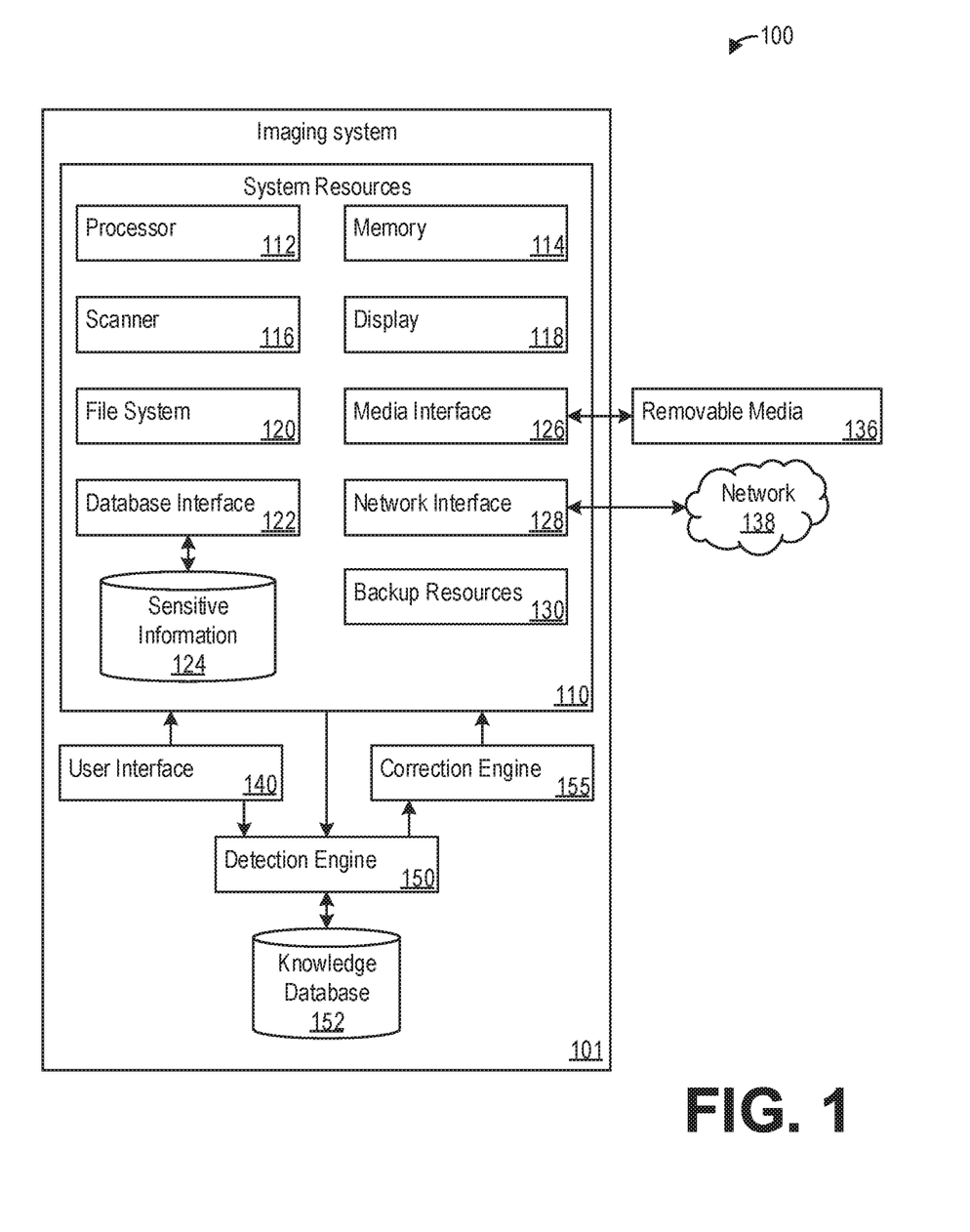
FIG. 1 shows a block schematic diagram illustrating an example imaging system according to an embodiment.
Figure 2:
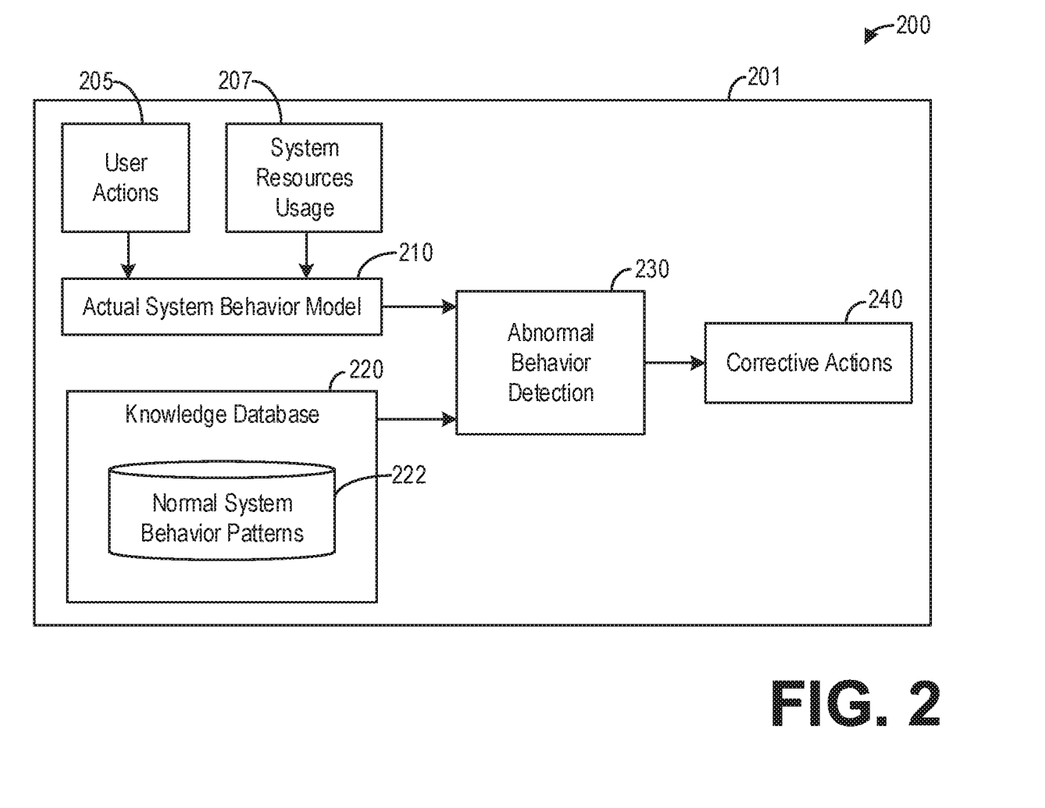
FIG. 2 shows a block diagram illustrating components of an imaging system for mitigating cyber-attacks on the imaging system according to an embodiment.

To mitigate the impact of cyber-attacks that may exploit unknown security vulnerabilities, an imaging system such as the imaging system depicted in FIG. 1 may include a security system embedded into the imaging system and configured to enhance existing security protocols. For example, as depicted in FIG. 2, such a security system uses knowledge of normal system behavior to detect abnormal behavior that may be caused by cyber-attacks, alert when the imaging system has been compromised, and prevent harmful effects of such attacks by performing corrective actions to secure the imaging system. A knowledge database may be configured with a plurality of patterns corresponding to normal or exemplary system behavior, which may be learned from the experience of actions that a user performs during a clinical workflow within the intended use of the imaging system. A method for creating such a plurality of patterns of normal system behavior, such as the method depicted in FIG. 3, includes measuring system markers during the execution of a normal workflow within the intended use of the imaging system, and storing the system markers as a pattern in the knowledge database. Such system markers indicate system events such as user interface events, access to internal interfaces, access to external transactions, and so on. A method for securing the imaging system in real-time, such as the method depicted in FIG. 4, includes measuring system markers during the use of the imaging system, and determining whether the pattern of system markers is similar to or deviates from known patterns of normal system behavior. Responsive to detecting abnormal behavior, which may comprise malicious activity, the imaging system may be placed into a secure mode so that the imaging system may continue to be used by the user in a safe way, while restricting the abnormal use of the imaging system.

Turning now to FIG. 1, a block diagram of an example system 100 for detecting abnormal use of an imaging system 101 and mitigating or reducing the abnormal use of the imaging system 101 in accordance with an embodiment is shown. The imaging system 101 may comprise a suitable non-invasive imaging system, including but not limited to an x-ray imaging system, a computed tomography (CT) imaging system, a positron emission tomography (PET) imaging system, a magnetic resonance imaging (MRI) system, an ultrasound system, and combinations thereof (e.g., a multi-modality imaging system such as a PET/CT imaging system).

The imaging system 101 includes system resources 110, such as a processor 112 and a non-transitory memory 114. The processor 112 may comprise one or more of a central processing unit (CPU), a graphics processing unit (GPU), a microprocessor, a digital signal processor (DSP), a field-programmable gate array (FPGA), or any other type of processor capable of performing logical operations. In some examples, the processor 112 may include multiple electronic components capable of carrying out processing functions. For example, the processor 112 may include two or more electronic components selected from a list of electronic components including a CPU, a DSP, an FPGA, and a GPU. One or more methods described herein may be implemented as executable instructions in the non-transitory memory 114 that when executed by the processor 112 causes the processor 112 to perform various actions. Such methods are described further herein with regard to FIGS. 3 and 4.

The system resources 110 of the imaging system 101 further include a scanner 116 for scanning or imaging a subject (not shown) such as a patient to acquire imaging data. Depending on the type of imaging system 101, the scanner 116 may comprise multiple components necessary for scanning the subject. For example, if the imaging system 101 comprises an x-ray imaging system, the scanner 116 may comprise an x-ray source and an x-ray detector mounted opposite each other on a C-arm gantry or via other mounting systems, as well as various components for controlling the x-ray source, the x-ray detector, and the C-arm gantry. As another example, if the imaging system 101 comprises a CT imaging system, the scanner 116 may comprise a CT tube and a detector array, as well as various components for controlling the CT tube and the detector array. As yet another example, if the imaging system 101 comprises an ultrasound imaging system, the scanner 116 may comprise an ultrasound transducer. Thus, the term "scanner" as used herein refers to the components of the imaging system 101 which are used and controlled to perform a scan of a subject.

The type of imaging data acquired by the scanner 116 also depends on the type or modality of the imaging system 101. For example, if the imaging system 101 comprises a CT imaging system, the imaging data acquired by the scanner 116 may comprise projection data. Similarly, if the imaging system 101 comprises an ultrasound imaging system, the imaging data acquired by the scanner 116 may comprise analog and/or digital echoes of ultrasonic waves emitted into the subject by the ultrasound transducer.

The system resources 110 of the imaging system 101 further include a display system 118 for displaying images acquired via the scanner 116, for example, as well as various graphical user interfaces for depicting information and facilitating user interaction with the imaging system 101.

The system resources 110 of the imaging system 101 further includes a file system 120, a database interface 122 for managing access to a database 124 of sensitive information, a media interface 126 for managing access to removable storage media 136, and a network interface 128 for managing access to an external network 138.

The system resources 110 of the imaging system 101 further include backup resources 130. As discussed further herein, the backup resources 130 may comprise hardware and software components that are activated by the correction engine 155, for example, in the event of abnormal behavior detection. For example, the backup resources 130 may comprise a processor and a non-transitory memory configured with sufficient software for controlling the scanner 116, for example, so that an interventional procedure being assisted by the scanner 116 may be completed while other components of the system resources 110 are disabled or shut down.

The imaging system 101 further comprises a user interface 140 that may be used to control operation of the imaging system 101. For example, the user interface 140 may be used to control the input of patient data, to change a scanning or display parameter, to select various modes, operations, and parameters, and the like. The user interface 140 may include one or more of a rotary dial, a mouse, a keyboard, a trackball, hard keys linked to specific actions, soft keys that may be configured to control different functions, a graphical user interface displayed on the display device 118 in embodiments wherein the display device 118 comprises a touch-sensitive display device or touch screen, and the like. In some examples, the user interface 140 may include a proximity sensor configured to detect objects or gestures that are within several centimeters of the proximity sensor. The proximity sensor may be located on either the display device 118, for example, or as part of a touch screen. The user interface 140 may include a touch screen positioned in front of the display device 118, for example, or the touch screen may be separate from the display device 118. The user interface 140 may also include one or more physical controls such as buttons, sliders, rotary knobs, keyboards, mice, trackballs, and so on, either alone or in combination with graphical user interface icons displayed on the display device 118. The display device 118 may be configured to display a graphical user interface (GUI) from instructions stored in the memory 114. The GUI may include user interface icons to represent commands and instructions. The user interface icons of the GUI are configured so that a user may select commands associated with each specific user interface icon in order to initiate various functions controlled by the GUI. For example, various user interface icons may be used to represent windows, menus, buttons, cursors, scroll bars, and so on. According to embodiments where the user interface 140 includes a touch screen, the touch screen may be configured to interact with the GUI displayed on the display device 118. The touch screen may be a single-touch touch screen that is configured to detect a single contact point at a time or the touch screen may be a multi-touch touch screen that is configured to detect multiple points of contact at a time. For embodiments where the touch screen is a multi-point touch screen, the touch screen may be configured to detect multi-touch gestures involving contact from two or more of a user's fingers at a time. The touch screen may be a resistive touch screen, a capacitive touch screen, or any other type of touch screen that is configured to receive inputs from a stylus or one or more of a user's fingers. According to other embodiments, the touch screen may comprise an optical touch screen that uses technology such as infrared light or other frequencies of light to detect one or more points of contact initiated by a user.

According to various embodiments, the user interface 140 may include an off-the-shelf consumer electronic device such as a smartphone, a tablet, a laptop, and so on. For the purposes of this disclosure, the term "off-the-shelf consumer electronic device" is defined to be an electronic device that was designed and developed for general consumer use and one that was not specifically designed for use in a medical environment. According to some embodiments, the consumer electronic device may be physically separate from the rest of the imaging system 101. The consumer electronic device may communicate with the system resources 110 such as the processor 112, for example, via the network interface 128 by way of a wireless protocol, such as Wi-Fi, Bluetooth, Wireless Local Area Network (WLAN), near-field communication, and so on.

As the imaging system 101 is connected to the network 138, there is a possibility that the imaging system 101 may be vulnerable to a cyber-attack. For example, a hostile agent may launch a sophisticated cyber-attack that targets the infrastructure and components of the imaging system 101. Even as security controls are improved to protect computing systems from cyber-attacks and imaging systems such as imaging system 101 are configured with security measures to reduce or eliminate the impact of cyber-attacks these security measures may lose effectiveness over time as attackers continue to develop more sophisticated techniques for compromising a device, and as device software may contain unknown vulnerabilities. In other words, cyber-security is a moving target, and a good countermeasure today may be inefficient tomorrow.

The imaging system 101 includes a detection engine 150 for detecting cyber-attacks by external forces that may attempt to access and control the system resources 110 of the imaging system 101. In particular, the detection engine 150 monitors the usage of system resources 110 as well as user input received via the user interface 140 to determine whether the usage is consistent with normal or typical usage of the imaging system 101. To that end, normal system behavior patterns may be determined and stored in a knowledge database 152. An example method for determining normal system behavior patterns is described further herein with regard to FIG. 3.

The detection engine 150 may evaluate the usage of the system resources 110 in real-time by comparing the usage to the normal system behavior patterns stored in the knowledge database 152. In some examples, the detection engine 150 may determine a pattern of actual system usage and calculate a measure of similarity to one or more normal system behavior patterns stored in the knowledge database 152. In such examples, the detection engine 150 determines that the actual system usage is abnormal responsive to the measure of similarity indicating a divergence from the normal system behavior patterns. For example, if the measure of similarity comprises a quantitative, real-valued similarity measure between the actual system usage and one or more normal system behavior patterns, the detection engine 150 may determine that the actual system usage is abnormal when the measure of similarity is below a similarity threshold.

In other examples, the detection engine 150 may comprise an artificial intelligence system, such as a machine learning algorithm, configured to automatically detect when system usage strays from patterns of normal system usage. For example, the detection engine 150 may comprise one or more deep learning algorithms such as one or more deep neural networks, one or more long short-term memory networks, one or more auto-encoders, one or more deep Boltzmann machines, and/or one or more deep belief networks. As another example, the detection engine 150 may comprise one or more other types of machine learning algorithms, such as one or more decision tree algorithms, one or more regression algorithms, and so on. In some examples, the detection engine 150 may comprise one or more instance-based algorithms, including but not limited to one or more k-nearest neighbor algorithms, one or more learning vector quantization algorithms, one or more self-organizing map algorithms, one or more locally-weighted learning algorithms, and/or one or more support vector machine algorithms. In order to accurately predict or detect whether the real-time use of the system resources 110 corresponds to normal system usage, the detection engine 150 may be trained, in accordance with supervised or un-supervised learning techniques, on known patterns of normal system usage stored in the knowledge database 152.

Furthermore, the imaging system 101 further includes a correction engine 155 configured to perform one or more corrective actions responsive to the detection engine 150 determining that the use of the system resources 110 is abnormal. In particular, the correction engine 155 performs the one or more corrective actions to secure the imaging system 101 so that an imaging procedure may proceed. In some examples, the one or more corrective actions performed by the correction engine 155 may depend on the type of abnormal behavior detected by the detection engine 150. An example method for performing corrective actions with the correction engine 155 responsive to detecting abnormal behavior with the detection engine 150 is described further herein with regard to FIG. 4.

As the abnormal activity may occur during an imaging session, the corrective actions are applied in order to protect the imaging system 101 from malicious activity while also enabling safe use of the imaging system 101 for imaging. As one example of a corrective action, the correction engine 155 may close internal and/or external interfaces, including the media interface 126 for facilitating access between the imaging system 101 and the removable media 136, the network interface 128 for facilitating access between the imaging system 101 and the network 138, and access to certain software libraries. As another example of a corrective action, the correction engine 155 may close or restrict access, via the database interface 122, to protected health information (PHI) and personally identifiable information (PII) and other sensitive information stored in the database 124 of sensitive information. As yet another example of a corrective action, the correction engine 155 may shut down compromised software and active dormant or backup software configured as backup resources 130 for providing patient-safety functions, such as enabling x-ray fluoroscopy to finalize an interventional procedure, preserving CPU and memory, and so on. The backup resources 130 may comprise hardware and software components that are activated by the correction engine 155, for example, in the event of abnormal behavior detection. For example, the backup resources 130 may comprise a processor and a non-transitory memory configured with sufficient software for controlling the scanner 116, for example, so that an interventional procedure being assisted by the scanner 116 may be completed while other components of the system resources 110 are disabled or shut down.

It should be appreciated that the detection engine 150 may comprise a processor and a non-transitory memory, in some examples, configured as described herein. That is, the detection engine 150 may comprise one or more computing components separate from the system resources 110 for monitoring the use of the system resources 110. Alternatively, the detection engine 150 may be implemented in the processor 112 and the memory 114, in some examples. Furthermore, the correction engine 155 may be implemented with the same processor and non-transitory memory as the detection engine 150, in some examples, or alternatively the correction engine 155 may comprise a separate processor and non-transitory memory from the processor and non-transitory memory forming the detection engine 150.

As an illustrative example, FIG. 2 shows a block diagram illustrating an example workflow 200 for mitigating cyber-attacks on the imaging system 201 according to an embodiment. The imaging system 201 may correspond to the imaging system 101, for example.

User actions 205 and system resources usage 207 are monitored to create a model 210 of actual system behavior. User actions 205 comprise actual user actions performed on the imaging system 201, and thus may comprise interactions of the user with the user interface 140 as well as with system resources 110 via the user interface 140. The system resources usage 207 comprises actual usage of system resources, such as system resources 110, in real-time. System resources usage 207 may therefore include, as illustrative and non-limiting examples, software application events, software programs and services executed, data transactions (internal and external), processor and memory usage, files and folders accessed for example in the file system 120, and so on.

The actual system behavior model 210 comprises a real-time model of the actual system behavior based on the user actions 205 and the system resources usage 207. In particular, the actual system behavior model 210 comprises a set of system markers corresponding to the user actions 205 and the system resources usage 207. The detection engine 150, for example, may perform the monitoring of the user actions 205 and the system resources usage 207, as well as the construction of the actual system behavior model 210 from system markers indicating the user actions 205 and the system resources usage 207.

A knowledge database 220, which may correspond to the knowledge database 152 of the imaging system 101, stores normal system behavior patterns 222. The normal system behavior patterns 222 correspond to models of actual system behavior, similar to the actual system behavior model 210, generated during normal workflows of the imaging system 201, or within the intended use of the imaging system 201. Each pattern of the normal system behavior patterns 222 thus comprises a plurality of system markers. In some examples, each pattern of the normal system behavior patterns 222 further comprises the plurality of system markers arranged in a workflow timeline, such that the system markers are ordered in accordance with their generation or creation over time, and such that the relative timing (e.g., elapsed time between system markers) is further stored in the pattern. The knowledge database 220 thus comprises a library of patterns of behavior in normal clinical workflows, created from markers of the user actions 205 and system resources usage 207 measured during the normal clinical workflows.

Abnormal behavior detection 230 may be performed by the detection engine 150, for example, and comprises calculating a similarity measure or similarity criteria of the actual system behavior model 210 relative to the normal system behavior patterns 222 stored in the knowledge database 220.

Corrective actions 240 may be performed by the correction engine 155, for example, and comprise one or more corrective actions performed responsive to the detection of abnormal behavior by the abnormal behavior detection module 230. The particular corrective actions 240 performed by the correction engine 155 may depend on the type of abnormal behavior detected during the abnormal behavior detection 230. For example, if sensitive information in the database 124 of sensitive information is being accessed and transferred via the network interface 128 to an external network 138, the corrective actions 240 may include restricting access to the database 124 via the database interface 122 and/or may restrict access to the network 138 via the network interface 128.

Figure 3:
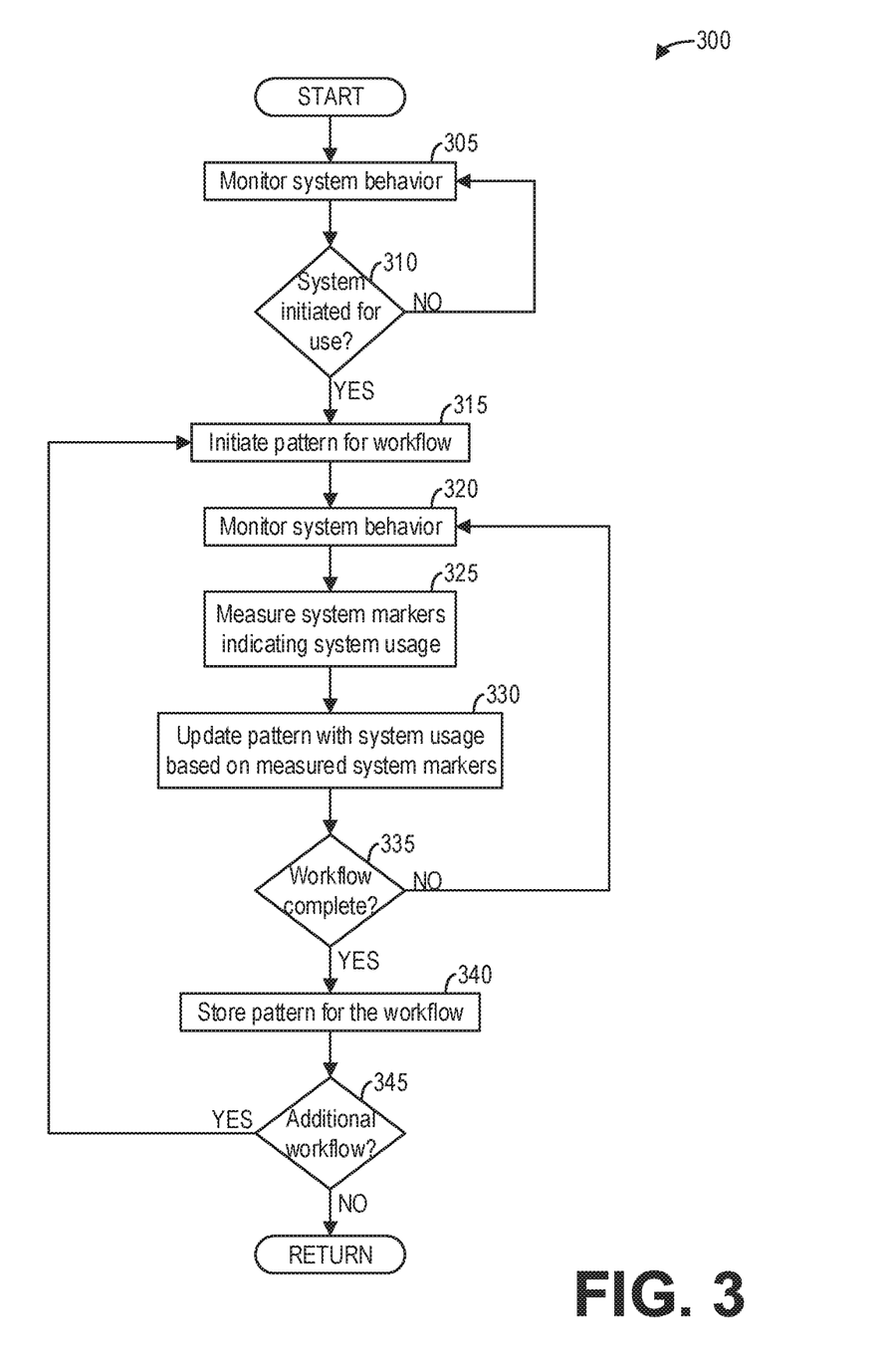
FIG. 3 shows a high-level flow chart illustrating an example method for measuring standard usage of an imaging system according to an embodiment.

FIG. 3 shows a high-level flow chart illustrating an example method 300 for measuring standard usage of an imaging system according to an embodiment. In particular, method 300 relates to generating normal system behavior patterns, such as the normal system behavior patterns 222, stored in the knowledge database 220 or knowledge database 152. In other words, method 300 relates to learning the normal system behavior. Method 300 is described with regard to the systems and components of FIGS. 1 and 2, though it should be appreciated that the method 300 may be implemented with other systems and components without departing from the scope of the present disclosure. Method 300 may be stored as executable instructions in the non-transitory memory 114 and may be executable by the processor 112 of the imaging system 101 to perform the actions described herein, as an illustrative and non-limiting example. In some examples, method 300 may be stored as executable instructions in non-transitory memory of the detection engine 150 and may be executable by the detection engine 150 to perform the actions described herein.

Method 300 begins at 305. At 305, method 300 monitors system behavior. For example, method 300 monitors the user interface 140 and the system resources 110 to determine any usage of the user interface 140 and/or the system resources 110. At 310, method 300 determines whether the system is initiated for use. If the system is not initiated for use ("NO"), method 300 returns to 305 to continue monitoring system behavior. Once the system is determined to be initiated for use ("YES") at 310, method 300 continues to 315.

At 315, method 300 initiates a pattern for a workflow. At 320, method 300 monitors system behavior by monitoring the user interface 140 and the system resources 110. At 325, method 300 measures system markers indicating system usage. For example, each interaction with the user interface 140 and/or the system resources 110 may be recorded or measured as a system marker. A system marker thus identifies an event or action occurring with regard to the system resources 110 and/or the user interface 140. For example, markers may include, but are not limited to: the user interface data and events, such as patient and procedure data, protocol settings, system configuration, applications used, and so on; the type of data in transit on network interfaces, removable media interfaces, and on internal application interfaces and databases, such as personal data, sensitive data, technical data, and so on; the software resources used, such as processor and memory usage; files and folders accessed; and so on. System markers may be defined a priori based on the knowledge of the system design.

At 330, method 300 updates the pattern with the system usage based on the measured system markers. Method 300 may update the pattern with the system markers organized according to timestamps of the system markers, such that the pattern reflects the timing and order of the measuring of the system markers.

At 335, method 300 determines if the workflow is complete. Method 300 may determine that the workflow is complete responsive to receiving an indication via the user interface 140, for example, that the workflow is complete. Thus the user of the imaging system 101 may manually indicate that the workflow is complete. In other examples, method 300 may automatically determine that the workflow is complete. For example, a system marker may be designated to indicate that the workflow is complete. For example, powering off the imaging system 101 or closing a session may be indicated by respective system markers, and the measurement of such system markers may indicate that the workflow is complete.

If the workflow is not complete ("NO"), method 300 returns to 320 to continue monitoring system behavior, measuring system markers, and updating the pattern. Method 300 continues measuring system markers and updating the pattern in this way until the workflow is complete. Once the workflow is complete ("YES") at 335, method 300 continues to 340. At 340, method 300 stores the pattern for the workflow. Method 300 may store the pattern in the knowledge database 152, for example, such that the pattern is stored as a normal system behavior pattern 222.

At 345, method 300 determines whether an additional workflow is initiated. If there is an additional workflow ("YES"), method 300 returns to 315 to initialize a new pattern for the additional workflow. Method 300 then measures system markers and updates the pattern until the additional workflow is complete. Method 300 may create and update patterns for workflows in this way until method 300 determines that there are no additional workflows ("NO") at 345. Method 300 then returns.

Thus, a method for learning normal system behavior is provided, wherein a set of user actions and system processes performed in a controlled "normal" clinical workflow within the intended use of the imaging system are identified and stored as a pattern. The user actions activate system applications and functions that require certain resources to be executed. This system behavior produces a set of system markers that can be measured, which in turn are used to calculate the patterns of system usage. The system patterns may be complex, and may in some examples be categorized into clusters. The system patterns are stored in the knowledge database 152 or 220, for example, to be implemented in the imaging system 101 or 201. A complete knowledge database 152 may include a plurality of such patterns that represent the whole set of user actions and thus provide a comprehensive representation of the clinical workflow within the intended use of the imaging system. Such patterns may be used for training data for training the detection engine 150 to predict or detect abnormal behavior, for example. Additionally or alternatively, such patterns may be used as a benchmark for the detection engine 150 to compare with real-time use of the imaging system.

Figure 4:
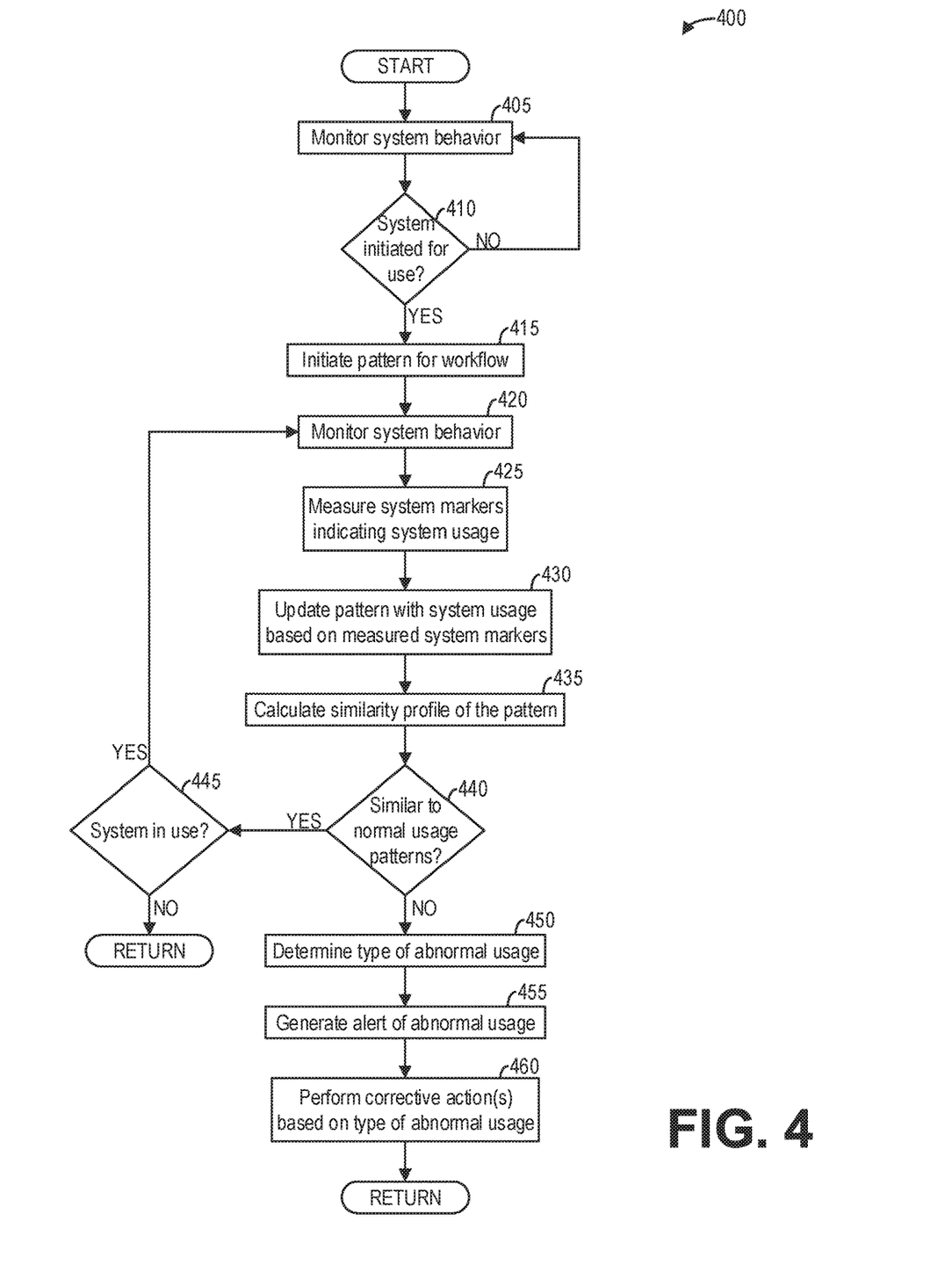
FIG. 4 shows a high-level flow chart illustrating an example method for detecting abnormal usage of an imaging system according to an embodiment.

FIG. 4 shows a high-level flow chart illustrating an example method 400 for detecting abnormal usage of an imaging system according to an embodiment. In particular, method 400 relates to evaluating the use of an imaging system with respect to patterns of normal system usage to detect abnormal system behavior, and applying corrective actions responsive to detecting the abnormal system behavior. Method 400 is described with regard to the systems and components of FIGS. 1 and 2, though it should be appreciated that the method 400 may be implemented with other systems and components without departing from the scope of the present disclosure. Method 400 may be stored as executable instructions in non-transitory memory of the detection engine 150, for example, and may be executable by the detection engine 150 to perform the actions described herein.

Method 400 begins at 405. At 405, method 400 monitors system behavior of the imaging system. For example, method 300 monitors the user interface 140 and the system resources 110 to determine any usage of the user interface 140 and/or the system resources 110. At 410, method 400 determines whether the imaging system is initiated for use.

Method 400 may determine that the imaging system is initiated for use based on the system behavior. As an illustrative example, method 400 may determine that the imaging system 101 is initiated for use responsive to detecting a user interacting with the user interface 140. Further, in some examples, when the imaging system is initiated for use, the user may select or indicate a type of workflow for using the imaging system. For example, the user may indicate, via the user interface 140, that the user will be using the imaging system to acquire images, for post-processing of images, for review and analysis of images, combinations thereof, and so on. If the system is not initiated for use ("NO"), method 400 returns to 405 to continue monitoring system behavior. Once the system is initiated for use ("YES"), method 400 continues from 410 to 415.

At 415, method 400 initiates a pattern for the workflow. At 420, method 400 monitors the system behavior as the user interacts with the imaging system, for example by activating system applications and functions that require certain resources to be executed. At 425, method 400 measures system markers indicating system usage monitored at 420. At 430, method 400 updates the pattern with the system usage based on the measured system markers.

For normal system usage, the pattern is expected to match as closely as possible with at least one pattern of the reference set of patterns of normal system usage. To that end, at 435, method 400 calculates a similarity profile of the pattern, wherein the similarity profile comprises a quantitative measure of similarity between the pattern and one or more patterns of normal system usage stored in the knowledge database. In some examples, method 400 may select one or more normal system usage patterns stored in the knowledge database according to the type of workflow initiated at 410, and method 400 may then compare the pattern to the selected one or more normal system usage patterns. For example, if the user indicates an intention to use the imaging system to acquire an image, method 400 may select one or more normal system usage patterns corresponding to workflows for image acquisition, whereas if the user indicates an intention to use the imaging system for image review without image acquisition, method 400 may select one or more normal system usage patterns corresponding to workflows for image review. In this way, method 400 does not necessarily compare the pattern to each pattern within the knowledge database, but rather selectively compares the pattern to a subset of patterns within the knowledge database.

At 440, method 400 determines whether the similarity profile calculated at 435 indicates that the pattern is similar to normal usage patterns. The similarity profile may indicate that the pattern is similar to one or more of the normal usage patterns if the similarity profile is above a similarity threshold, for example. The similarity threshold may be determined such that small deviations from the normal usage patterns, such as differences in elapsed time between system markers, or a small re-ordering of system markers in the pattern, may be considered as normal usage. More substantial deviations from the normal usage pattern, such as the measurement of system markers that are entirely absent from the normal usage pattern or measurements of elapsed time between system markers that suggest the use of a script for automating control of the imaging system, may cause the similarity profile to fall below the similarity threshold. Therefore, if the similarity profile is below the similarity threshold, the use of the imaging system may be considered abnormal. Furthermore, the determination of abnormality depends on the system markers causing the deviation from the normal pattern. For example, the deviation of some system markers from the normal pattern may not be suggestive of abnormal usage, and so such deviation may be accounted for when determining the similarity threshold.

If the pattern is similar ("YES"), method 400 continues to 445. At 445, method 400 determines whether the imaging system is still in use. Method 400 may determine that the imaging system is in use or not in use based on the system markers most recently added to the pattern at 430. For example, if one of the most recent system markers added to the pattern indicates that the workflow is complete and/or that the imaging system is being powered down, then method 400 may conclude that the imaging system is no longer in use. Otherwise, method 400 may determine that the imaging system is still in use.

Thus, if method 400 determines that the imaging system is no longer in use ("NO"), method 400 returns. In this way, method 400 monitors the use of the imaging system in real-time to determine whether abnormal use occurs, and method 400 does not perform corrective actions if abnormal use is not observed during the workflow.

However, if the imaging system is still in use ("YES"), method 400 returns to 420 to continue monitoring system behavior and evaluating the similarity of the workflow pattern. Once the system is no longer in use ("NO") at 445, method 400 then returns. In this way, method 400 evaluates the usage of the system in real time to determine whether the usage is similar to known usage patterns indicated as normal and appropriate usage of the system until the system is no longer in use.

If method 400 determines, however, that the pattern is not similar to normal usage patterns ("NO") at 440, method 400 continues to 450. At 450, method 400 determines a type of abnormal usage based on the similarity profile. For example, method 400 may identify one or more system markers in the pattern that cause the similarity profile to indicate abnormal usage, and may then determine the type of abnormal usage based on the one or more system markers.

At 455, method 400 generates an alert of the abnormal usage. For example, method 400 may generate an alert that is displayed via the display 118, such that the user of the imaging system 101 may be informed that abnormal use of the imaging system is detected and/or that the imaging system is entering a secure mode, wherein certain actions may be restricted. Continuing at 460, method 400 performs one or more corrective actions based on the type of abnormal usage. As an illustrative example, the one or more system markers identified at 450 may indicate that the abnormal usage comprises the access of sensitive data in the database 124 of sensitive information as well as the transfer of the sensitive data via the network interface 128 to the network 138. In response, method 400 may perform corrective actions such as restricting access to the database 124 of sensitive information and/or restricting access to the imaging system 101 via the network interface 128. As another illustrative example, the one or more system markers identified at 450 may indicate that one or more acquisition parameters for controlling the scanner 116 are adjusted outside of parameter boundaries set by an imaging protocol, and furthermore may indicate that the acquisition parameters are adjusted without a corresponding input via the user interface 140. As such behavior suggests that control of the scanner 116 is compromised and furthermore that an external agent is attempting to control the scanner 116, method 400 may shut down access from the network 138 via the network interface 128, shut down the processor 112 which is possibly compromised, and activate the backup resources 130 to provide secure control of the scanner 116. In this way, method 400 may ensure that an imaging procedure being carried out by the imaging system 101 may continue operating while preserving patient safety (e.g., by preserving the functionality of the scanner 116 necessary to finish an interventional procedure). After performing the corrective action(s) at 460, method 400 then returns.

Thus, a method for securing an imaging system from cyberattacks includes detecting abnormal system behavior and applying corrective actions. Consider a set of user actions performed in the real world on an imaging system, which are all the actions that are executed on the imaging system by any user, legitimate or not. These user actions activate system applications and functions that require certain resources to be executed. This system behavior produces a set of markers that can be measured, which are in turn used to calculate the patterns of the actual usage of the system. These actual system patterns are expected to match as closely as possible with the reference set of patterns of normal system usage. If the similarity criteria between the actual and normal system patterns is not met, then the system behavior is considered abnormal, and corresponding corrective actions are performed in order to put the system in a secure mode during clinical operation to continue operating while preserving patient safety.

A technical effect of the present disclosure includes a securing of an imaging system responsive to detecting abnormal system behavior. Another technical effect includes controlling an imaging system to selectively restrict external access during an imaging session. Yet another technical effect of the disclosure includes a fail-safe mechanism for an imaging system wherein a configuration of the imaging system is modified in real-time in order to secure the system during clinical operation and to continue operating by preserving patient safety.

Thus, in one embodiment, a method for an imaging system comprises monitoring usage of the imaging system in real-time while a user is controlling the imaging system, detecting that the usage of the imaging system is an abnormal usage, and performing one or more corrective actions based on the abnormal usage.

In a first example of the method, monitoring usage of the imaging system comprises measuring system markers indicating one or more of user actions and usage of system resources while the user is controlling the imaging system. In a second example of the method optionally including the first example, the method further comprises calculating a similarity of the measured system markers to one or more patterns of normal system usage, and detecting that the usage of the imaging system is the abnormal usage when the similarity is below a similarity threshold. In a third example of the method optionally including one or more of the first and second examples, similarity criteria for calculating the similarity of the measured system markers to the one or more patterns of normal system usage depends a distance between an a real-time pattern including the measured system markers from the one or more patterns of normal system usage, and on the measured system markers causing a deviation of the real-time pattern from the one or more patterns of normal system usage. In a fourth example of the method optionally including one or more of the first through third examples, the method further comprises inputting the measured system markers to machine learning model trained on a plurality of patterns of normal system usage, and detecting that the usage of the imaging system is the abnormal usage based on output of the machine learning model. In a fifth example of the method optionally including one or more of the first through fourth examples, the method further comprises determining a type of the abnormal usage based on at least one system marker of the measured system markers, wherein the one or more corrective actions are performed according to the type of the abnormal usage. In a sixth example of the method optionally including one or more of the first through fifth examples, the one or more corrective actions include one or more of restricting access to system resources via internal or external interfaces, shutting down system resources, and activating backup resources. In a seventh example of the method optionally including one or more of the first through sixth examples, the method further comprises allowing the user to continue controlling the imaging system after performing the one or more corrective actions. In an eighth example of the method optionally including one or more of the first through seventh examples, the method further comprises generating an alert to the user indicating the abnormal usage.

In another embodiment, a method for an imaging system comprises measuring system markers indicating one or more of user actions and usage of imaging system resources while a user is controlling the imaging system, comparing the measured system markers to one or more patterns of normal imaging system usage, detecting abnormal usage of the imaging system based on the comparison of the measured system markers to the one or more patterns of normal imaging system usage, performing one or more corrective actions based on the abnormal usage to secure the imaging system from the abnormal usage, and allowing the user to continue controlling the imaging system.

In a first example of the method, the system markers indicate one or more of user interface events, access to a database, access to external resources, and access of computing resources. In a second example of the method optionally including the first example, performing the one or more corrective actions based on the abnormal usage comprises performing one or more of restricting access to the database, restricting access to the external resources, and restricting access to the computing resources. In a third example of the method optionally including one or more of the first and second examples, comparing the measured system markers to one or more patterns of normal imaging system usage comprises calculating a similarity of a real-time pattern including the measured system markers to the one or more patterns of normal imaging system usage. In a fourth example of the method optionally including one or more of the first through third examples, detecting the abnormal usage of the imaging system comprises determining that a similarity of the real-time pattern to the one or more patterns of normal imaging system usage is below a similarity threshold.

In yet another embodiment, an imaging system comprises a scanner configured to acquire an image of internal structures of an imaging subject, a user interface configured to receive input from a user, and a processor communicatively coupled to the scanner and the user interface, the processor configured with instructions in non-transitory memory that when executed cause the processor to: monitor usage of the imaging system in real-time while the user is controlling the imaging system; detect that the usage of the imaging system is an abnormal usage; and perform one or more corrective actions based on the abnormal usage.

In a first example of the system, the scanner comprises an x-ray imaging device, an ultrasound imaging device, a magnetic resonance imaging device, a computed tomography imaging device, or a positron emission tomography imaging device. In a second example of the system optionally including the first example, in order to monitor the usage of the imaging system, the processor is configured with instructions in the non-transitory memory that when executed cause the processor to measure system markers indicating one or more of user actions and usage of system resources while the user is controlling the imaging system. In a third example of the system optionally including one or more of the first and second examples, the processor is configured with instructions in the non-transitory memory that when executed cause the processor to calculate a similarity of the measured system markers to one or more patterns of normal system usage, and detect that the usage of the imaging system is the abnormal usage when the similarity is below a similarity threshold. In a fourth example of the method optionally including one or more of the first through third examples, the processor is configured with instructions in the non-transitory memory that when executed cause the processor to determine a type of the abnormal usage based on at least one system marker of the measured system markers, wherein the one or more corrective actions are performed according to the type of the abnormal usage. In a fifth example of the method optionally including one or more of the first through fourth examples, the one or more corrective actions include one or more of restricting access to system resources via internal or external interfaces, shutting down system resources, and activating backup resources.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method executable via instructions stored in memory of an imaging system and executed by a processor of the imaging system, the method comprising:

monitoring, with the imaging system, usage of the imaging system in real-time while a user is controlling the imaging system, the monitoring including measuring system markers and aggregating the measured system markers into a real-time pattern of usage that reflects a timing and order of the measured system markers, the system markers indicating one or more of user actions and usage of system resources while the user is controlling the imaging system, the system markers including patient data, imaging procedure data, and imaging protocol settings, wherein the imaging system includes a scanner and wherein the user controls the imaging system to acquire, via the scanner, imaging data of a patient;

detecting, with the imaging system, that the usage of the imaging system is an abnormal usage based on the real-time pattern of usage relative to one or more patterns of normal system usage; and performing, with the imaging system, one or more corrective actions based on the abnormal usage, wherein the user is allowed to continue controlling the imaging system to acquire the imaging data of the patient while and/or after performing the one or more corrective actions.

2. The method of claim 1, further comprising calculating a similarity of the real-time pattern of usage to the one or more patterns of normal system usage, and detecting that the usage of the imaging system is the abnormal usage when the similarity is below a similarity threshold.

3. The method of claim 2, wherein the one or more patterns of normal system usage are selected from a knowledge database based on a type of workflow currently instituted for using the imaging system.

4. The method of claim 2, wherein similarity criteria depends on a distance between the real-time pattern from the one or more patterns of normal system usage, and on the measured system markers causing a deviation of the real-time pattern from the one or more patterns of normal system usage.

5. The method of claim 1, further comprising inputting the measured system markers to machine learning model trained on a plurality of patterns of normal system usage, and detecting that the usage of the imaging system is the abnormal usage based on output of the machine learning model.

6. The method of claim 1, further comprising determining a type of the abnormal usage based on at least one system marker of the measured system markers, wherein the one or more corrective actions are performed according to the type of the abnormal usage.

7. The method of claim 1, wherein the one or more corrective actions include one or more of restricting access to system resources via internal or external interfaces, shutting down system resources, and activating backup resources, and further comprising generating an alert to the user indicating the abnormal usage.

8. The method of claim 1, wherein performing, with the imaging system, one or more corrective actions based on the abnormal usage comprises disabling or shutting down system resources other than resources that allow the user to control the scanner to acquire the imaging data of the patient.

9. The method of claim 8, wherein disabling or shutting down system resources other than resources that allow the user to control the scanner to acquire the imaging data of the patient includes disabling access to the imaging system via a network interface, and wherein the user is allowed to continue controlling the imaging system to acquire the imaging data of the patient while and/or after the access to the imaging system via the network interface is disabled.

10. A method executable by an imaging system via instructions stored in memory of the imaging system and executed by a processor of the imaging system, comprising:

measuring, with the imaging system, system markers indicating one or more of user actions and usage of imaging system resources while a user is controlling the imaging system;

comparing, with the imaging system, the measured system markers to one or more patterns of normal imaging system usage, the one or more patterns of normal imaging system usage selected from a knowledge database based on a type of workflow currently instituted for using the imaging system, the type of workflow currently instituted for using the imaging system including one or more of using the imaging system to acquire images, using the imaging system for post-processing of images, and using the imaging system for review and analysis of images;

detecting, with the imaging system, abnormal usage of the imaging system based on the comparison of the measured system markers to the one or more patterns of normal imaging system usage;

performing, with the imaging system, one or more corrective actions based on the abnormal usage to secure the imaging system from the abnormal usage; and allowing, with the imaging system, the user to continue controlling the imaging system while performing the one or more corrective actions.

11. The method of claim 10, wherein the system markers indicate one or more of user interface events, access to a database, access to external resources, and access of computing resources, and wherein the type of workflow currently instituted for using the imaging system is using the imaging system to acquire images, and wherein the one or more patterns of normal system correspond to workflows for image acquisition.

12. The method of claim 11, wherein performing the one or more corrective actions based on the abnormal usage comprises performing one or more of restricting access to the database, restricting access to the external resources, and restricting access to the computing resources.

13. The method of claim 10, wherein comparing the measured system markers to one or more patterns of normal imaging system usage comprises calculating a similarity of a real-time pattern including the measured system markers to the one or more patterns of normal imaging system usage.

14. The method of claim 13, wherein detecting the abnormal usage of the imaging system comprises determining that the similarity of the real-time pattern to the one or more patterns of normal imaging system usage is below a similarity threshold.

15. An imaging system, comprising:
a scanner including an imaging detector configured to acquire imaging data usable to generate an image of internal structures of an imaging subject; and
a processor communicatively coupled to the scanner, the processor configured with instructions in non-transitory memory that when executed cause the processor to:
monitor usage of the imaging system in real-time while a user is controlling the imaging system to acquire, via the scanner, the imaging data of the imaging subject;
detect that the usage of the imaging system is an abnormal usage; and
perform one or more corrective actions based on the abnormal usage, the one or more corrective actions including restricting access to protected health information and personally identifiable information stored in a database of sensitive information, the one or more corrective actions performed while the user controls the imaging system to acquire the imaging data.

16. The system of claim 15, wherein the scanner comprises an x-ray imaging device, an ultrasound imaging device, a magnetic resonance imaging device, a computed tomography imaging device, or a positron emission tomography imaging device.

17. The system of claim 15, wherein, to monitor the usage of the imaging system, the processor is configured with instructions in the non-transitory memory that when executed cause the processor to measure system markers indicating one or more of user actions and usage of system resources while the user is controlling the imaging system.

18. The system of claim 17, wherein the processor is configured with instructions in the non-transitory memory that when executed cause the processor to calculate a similarity of the measured system markers to one or more patterns of normal system usage, and detect that the usage of the imaging system is the abnormal usage when the similarity is below a similarity threshold.

19. The system of claim 17, wherein the processor is configured with instructions in the non-transitory memory that when executed cause the processor to determine a type of the abnormal usage based on at least one system marker of the measured system markers, wherein the one or more corrective actions are performed according to the type of the abnormal usage.

20. The system of claim 15, wherein the one or more corrective actions include one or more of restricting access to system resources via internal or external interfaces, shutting down system resources, and activating backup resources.

* * * * *